United States Patent

Ashenafi

[11] Patent Number: 6,072,753
[45] Date of Patent: Jun. 6, 2000

[54] AUTOMATIC RADIO PROGRAM RECORDER

[76] Inventor: Solomon M. Ashenafi, 9350 SW. Bailey St.#16, P.O. Box 544, Wilsonville, Oreg. 97070

[21] Appl. No.: 09/046,223

[22] Filed: Mar. 23, 1998

Related U.S. Application Data

[63] Continuation-in-part of application No. 08/771,668, Dec. 24, 1996, Pat. No. 5,761,159.

[51] Int. Cl.[7] .................................................. H04H 9/20
[52] U.S. Cl. ........................................................ 369/7
[58] Field of Search ................................ 369/7, 6, 2, 10, 369/11, 12; 360/1, 5, 6, 15, 16; 455/6.3, 345, 346, 349

[56] References Cited

U.S. PATENT DOCUMENTS

| | | | |
|---|---|---|---|
| 4,305,101 | 12/1981 | Yarbrough et al. . | |
| 5,361,173 | 11/1994 | Ishii et al. | 360/27 |
| 5,463,599 | 10/1995 | Yifrach et al. | 369/7 |
| 5,483,506 | 1/1996 | Yoshioka et al. . | |
| 5,568,453 | 10/1996 | Okada . | |
| 5,745,640 | 4/1998 | Ishii et al. | 386/83 |
| 5,870,150 | 2/1999 | Yuen | 348/553 |

FOREIGN PATENT DOCUMENTS

| | | | |
|---|---|---|---|
| 54-130003 | 10/1979 | Japan | 369/7 |
| 55-1603 | 8/1980 | Japan | 369/7 |
| 58-194185 | 12/1983 | Japan | 369/7 |
| 59-79450 | 8/1984 | Japan | 360/7 |
| 149331 | 2/1989 | Japan . | |
| 149332 | 2/1989 | Japan . | |
| 1162424 | 6/1989 | Japan . | |
| 1162429 | 6/1989 | Japan . | |
| 162426 | 6/1989 | Japan . | |
| 2190535 | 11/1987 | United Kingdom . | |

Primary Examiner—Tan Dinh
Attorney, Agent, or Firm—Leonard Heyman

[57] ABSTRACT

A recording device includes a timer for automatically starting and stopping the recording mechanism, an input jack for accepting audio signals directly from an external audio source, and a power supply for the audio source. When a recording interval begins, the device supplies the external audio source with the required power via the power supply and the recording mechanism begins receiving audio signals received in the input jack and storing them on recording media for later playback. Alternatively, the device may be equipped with a microphone for accepting sound waves in addition to an electrical audio input. It is contemplated that the device be programmable to permit multiple start/stop intervals including daily and weekly intervals. The device can also be equipped with an audio amplifier and speaker for playback of recorded programs at a convenient time.

11 Claims, 3 Drawing Sheets

AUTOMATIC RADIO PROGRAM RECORDER

CROSS REFERENCE TO RELATED APPLICATION

This application is a Continuation-in-Part of U.S. patent application Ser. No. 8/771,668 filed Dec. 24, 1996, now U.S. Pat. No. 5,761,159.

BACKGROUND OF THE INVENTION

This invention relates to a device for recording and reproducing audio signals or radio broadcasts on cassette tapes or other storage media.

Listeners turn on their radios in their homes, offices, motor vehicles, or outdoors with portable devices, etc., in order to listen to a variety of broadcasts that the media seeks to deliver them everyday. These broadcasts include: news and current affair programs, sports reports, weather forecasts, music shows, etc. However, because of various reasons, listeners miss out on listening to these broadcasts.

Although conventional radios and cassette-tape-recorders are available in different shapes and sizes with different features, they inherently have had disadvantages. One major difficulty is that cassette-tape-recorders are unable to solve listeners'scheduling problems. For example, a listener may be unable to listen to a particular radio broadcast due to the necessity of meeting other personal commitments. At present, the only available choice a listener has is to do one thing or the other, i.e., either miss the broadcast, or fail to meet the commitment. Another common problem is that when a listener wishes to listen to a particular broadcast, he is subject to following the broadcast date and time. Another common problem is the necessity of being physically present to record a broadcast.

If the listener decides to physically wait around to listen to the broadcast, he is required to turn on the radio and dial the station in time in order to listen to the entire broadcast. If he wishes to record the broadcast, he still has to attend the recording process by pushing the "Record" and "Stop" buttons at the beginning and end of the broadcast.

Being unable to physically wait around to turn on the radio and listen, or worse yet, forgetting to push the recording button(s) will result in missing the broadcast all together.

If copies of these broadcasts are available for sale, the prices are often prohibitively high. Besides, listeners may be unaware of the existence of such services, if any or where to get them.

BRIEF SUMMARY OF THE INVENTION

The object of this invention is to provide an easily attachable device and method of recording an audio information signal or a broadcast in unattended mode.

Another object of the invention is to provide an easily attachable device and method of recording an audio information signal or a broadcast for both indoor and outdoor use.

Another object of the invention is to provide an easily attachable device and method of recording a single, daily, or weekly broadcasts without requiring listeners to change or discard the conventional radios they currently own.

Accordingly, by performing the recording and reproducing functions, this easily attachable device serves as a complement to a conventional radio or other media when recording an audio information signal or a broadcast and reproducing the recorded signal or broadcast.

According to the invention, the device contains a microprocessor unit, a customized listener-friendly program, and an audio signal cable or other means for routing an audio information signal from its source to the audio signal receiving circuitry of the device.

Accordingly, further advantages of the invention include putting the listeners in control by solving their scheduling problems, and making broadcasts easily and conveniently accessible to listeners'lifestyles. Still further objects and advantages will become apparent from a consideration of the ensuing description and drawings.

DETAILED DESCRIPTION OF THE INVENTION

Figure 1:
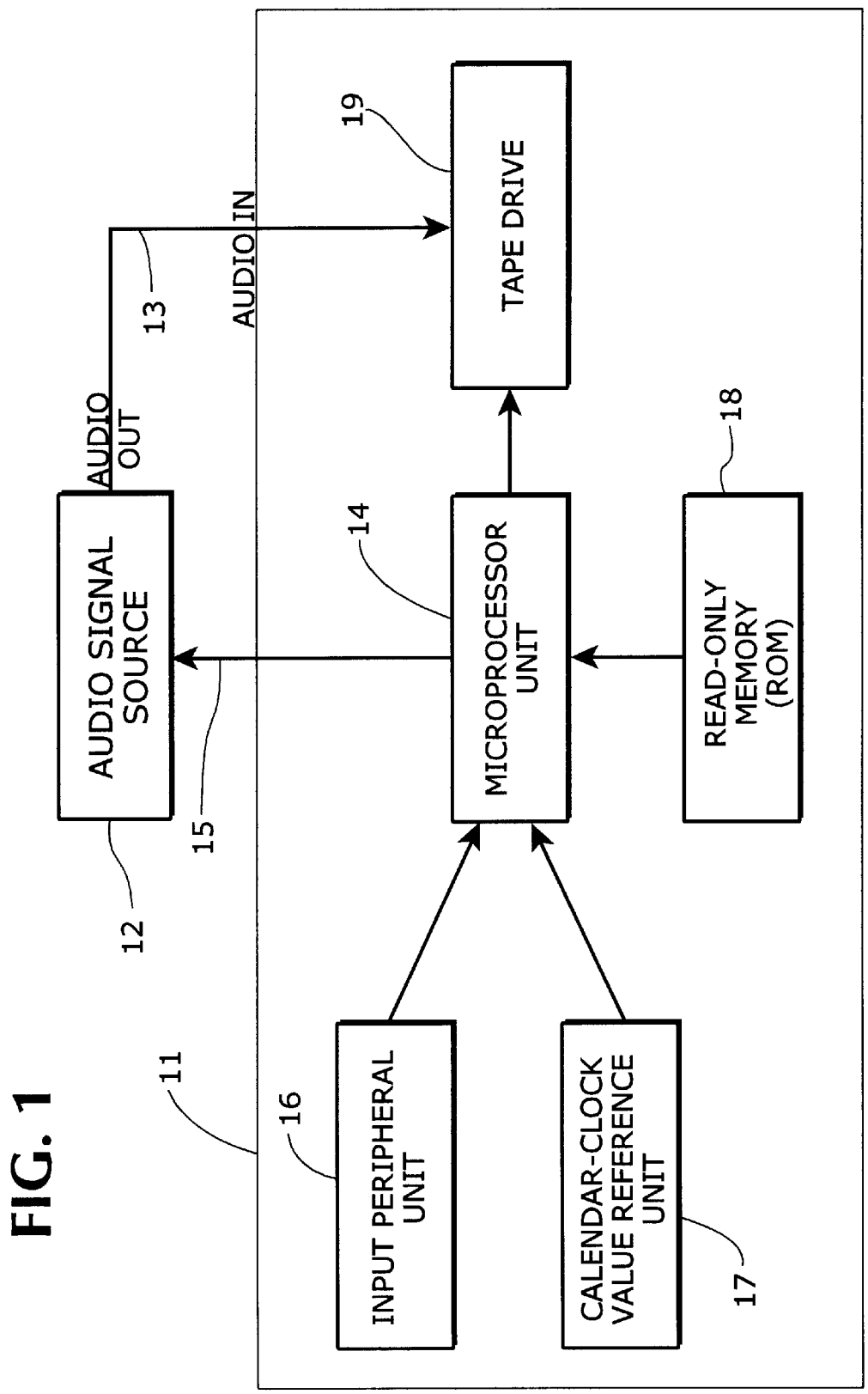
FIG. 1 is a block diagram representing a recorder according to a first preferred embodiment of the invention.

Referring to FIG. 1, an easily attachable recording device, indicated generally at 11, is used to record an audio information signal or broadcast from its source 12.

Audio signal source 12, which may be a conventional radio, is connected to attachable recording device 11 with audio signal cable 13 and power cable 15.

The audio signal cable 13 plugs into an audio output jack (not shown) of audio signal source 12 and into an audio input jack (not shown) of recording device 11.

The power cable 15 of audio signal source 12 is connected to recording device 11 so that a predetermined level of power supply to audio signal source 12 is regulated by microprocessor unit 14.

Microprocessor unit 14, which is the controlling center of recording device 11, is connected to input peripheral unit 16, calendar-clock value reference unit 17, read-only memory (ROM) 18, and tape drive 19, which is preferably an audio cassette recording mechanism.

Input peripheral unit 16 is used by a listener to feed in an instruction into microprocessor unit 14. In accordance with a predetermined listener-friendly program stored in ROM 18, microprocessor unit 14 carries out the tasks specified by the instruction set.

For example, input peripheral 16 is preferably provided with a function key. When pressed, the CPU displays a series of options and questions in the LCD display. For example, the options and questions may be as follows:

"SPECIFY AUDIO SIGNAL SOURCE:
 "Press 1 for AC operated source
 "Press 2 for DC (battery) operated source
 "Press 3 for Other"

If "1" is selected, the user is instructed to plug AC power cable 15 of audio signal source 12 into the AC power outlet of recording device 11. The user may then be instructed to plug audio signal cable 13 of recording device 11 into the audio output jack of audio signal source 12. This final instruction may be displayed in response to pressing a button marked "ENTER/NEXT" or other button indicating completion of the first instruction. Alternatively, recording device 11 may have a sensor to determine if power cable 15 is connected to it.

If "2" is selected from the option menu above, the user will be asked to enter the voltage that audio signal source 12 requires to operate. Thus, if audio signal source 12 takes 4 batteries in series at 1.5 volts each, the user would enter in 6 volts. The user will then be instructed to plug dc power cable 15 of recording device 11 into the "DC IN" jack of audio signal source 12. As with the AC power option above, the user is then instructed to plug audio signal cable 13 of recording device 11 into the audio output jack of audio signal source 12. In order to provide a universal use of recording device 11, the DC power cable 15 is provided with different kinds of plugs, clasps, etc. to work with any audio source on the market.

If "3" is selected from the option menu, it will be assumed that the user wishes to make a live recording, and so the user will be instructed to plug a microphone 13 into audio input jack of recording device 11.

When a listener wishes to record a future broadcast, he feeds the instruction set of pre-programming values from the input peripheral unit 16 into the microprocessor unit 14 where the instruction is decoded and enter in memory. With this instruction set, the microprocessor unit 14 is triggered and begins counting until the pre-programmed values are reached.

For example, once the user has specified the audio signal source as described above, the user is preferably instructed to turn on the audio signal source 12 and dial the station that the user wishes to record if it's a radio.

The user is then prompted to select a recording mode. For example, the user is asked to select "1" for a single recording, "2" for daily recordings, or "3" for weekly recordings. If either "1" or "3" is selected, the user is asked to enter a DATE for the recording to take place. Then, the user is asked to enter an ON time, then an OFF time.

Figure 3:
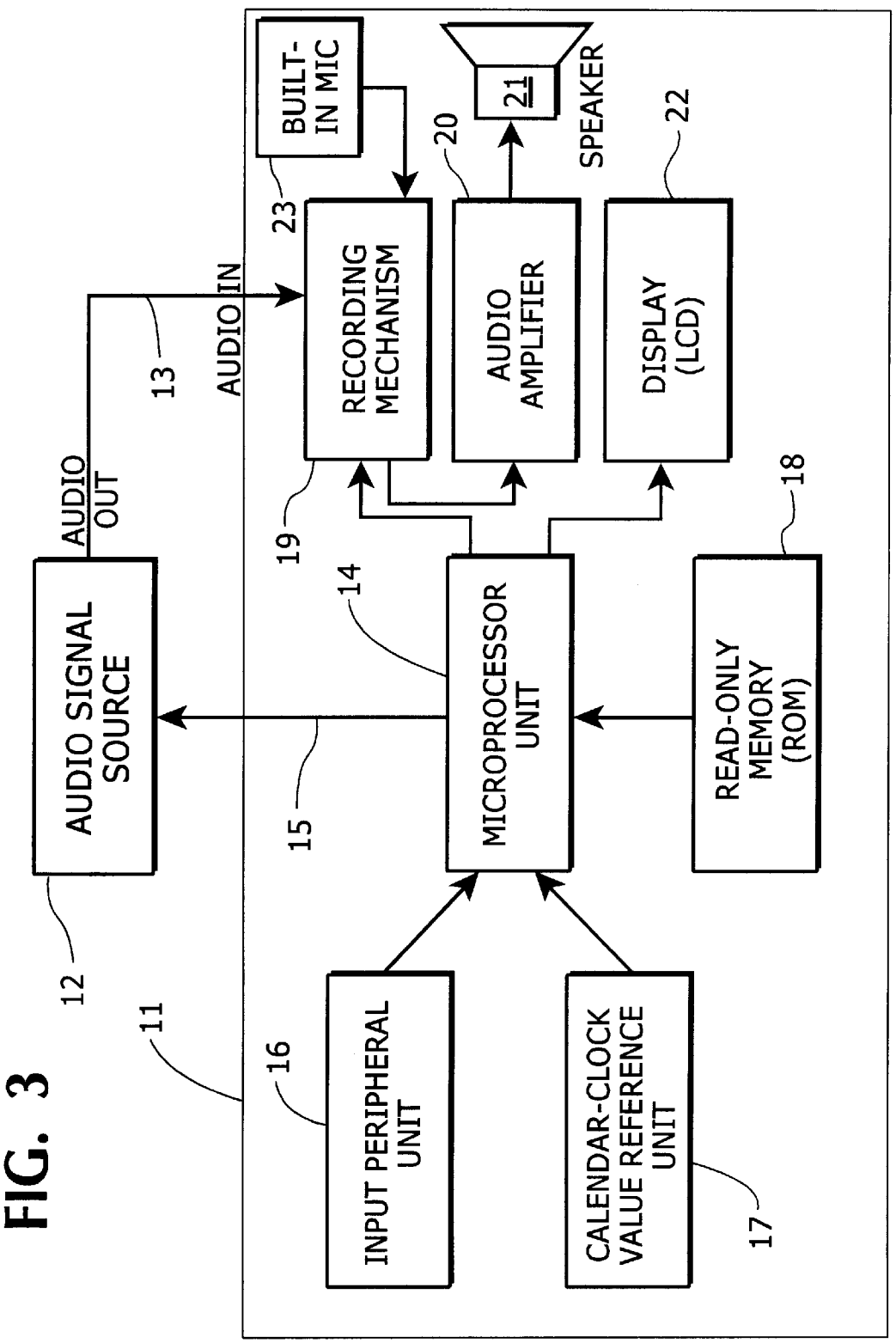
FIG. 3 is a block diagram representing a second preferred embodiment of the invention having a reproducing means, such as a speaker, and a visual display means, such as a liquid crystal display (LCD).

Finally, the user is asked to select between a "silent recording" method or a "recording while listening" method. If recording device 11 does not have a speaker as in FIG. 1, then the user is instructed to fully plug in audio cable 13 into audio signal source 12 for silent recording, and partially plug in audio cable 13 into audio source 12 for recording while listening. If recording device 11 has a speaker 21 as shown in FIG. 3, then speaker 21 is automatically activated during recording if the recording while listening method is chosen, otherwise it is not activated.

A timed-recording switch or button (not shown) will permit the user to cancel the recording, placing recording device 11 back into standby mode. In stanby mode, no programmed recording will be carried out. Instead, the listener will be able to utilize the audio source, which might be a conventional radio, as it was designed.

If not in standby mode, microprocessor unit 14, in accordance with start/end recording signals, powers recording device 11 up/down, respectively, when it detects that the pre-programmed values in its memory match the reference values on the calendar-clock value reference unit 17. At the same time, by regulating the predetermined level of power supply in line with the start/end recording signals, microprocessor unit 14 turns audio signal source 12 on/off respectively.

Recording a tape starts with an audio information signal to be recorded. When audio signal source 12 is on or playing, its audio information signal is present on its audio output jack. This audio information signal that is present on the audio output jack exits from audio signal source 12 and is routed via audio signal cable 13 to enter in the audio input jack of recording device 11. Once the audio information signal is on the input jack of the recording device 11, it is then directed to tape drive 19 where it is recorded in an audio cassette tape or other storage medium.

The audio information or broadcast signal that is being supplied via audio signal cable 13 into tape drive 19 is recorded continuously in unattended mode until microprocessor unit 14 powers recording device 11 down and turns audio signal source 12 off.

Thus, audio signal cable 13 serves as a means by which an audio information signal is routed out from its source to recording device 11. Optionally, any other audio information signal routing means, such as a microphone, may be used in place of audio signal cable 13. Such a microphone can be a built-in microphone 23 which built into the recording device 11 as shown in FIG. 3, or it can be separate to provide a better recording quality since built-in microphones will pick up noise and vibrations from tape drive 19.

When an instruction is received from input peripheral unit 16 to record a broadcast that is being aired, microprocessor unit 14 responds by producing the control signals necessary for the continuous operation of the recording function.

Figure 2:
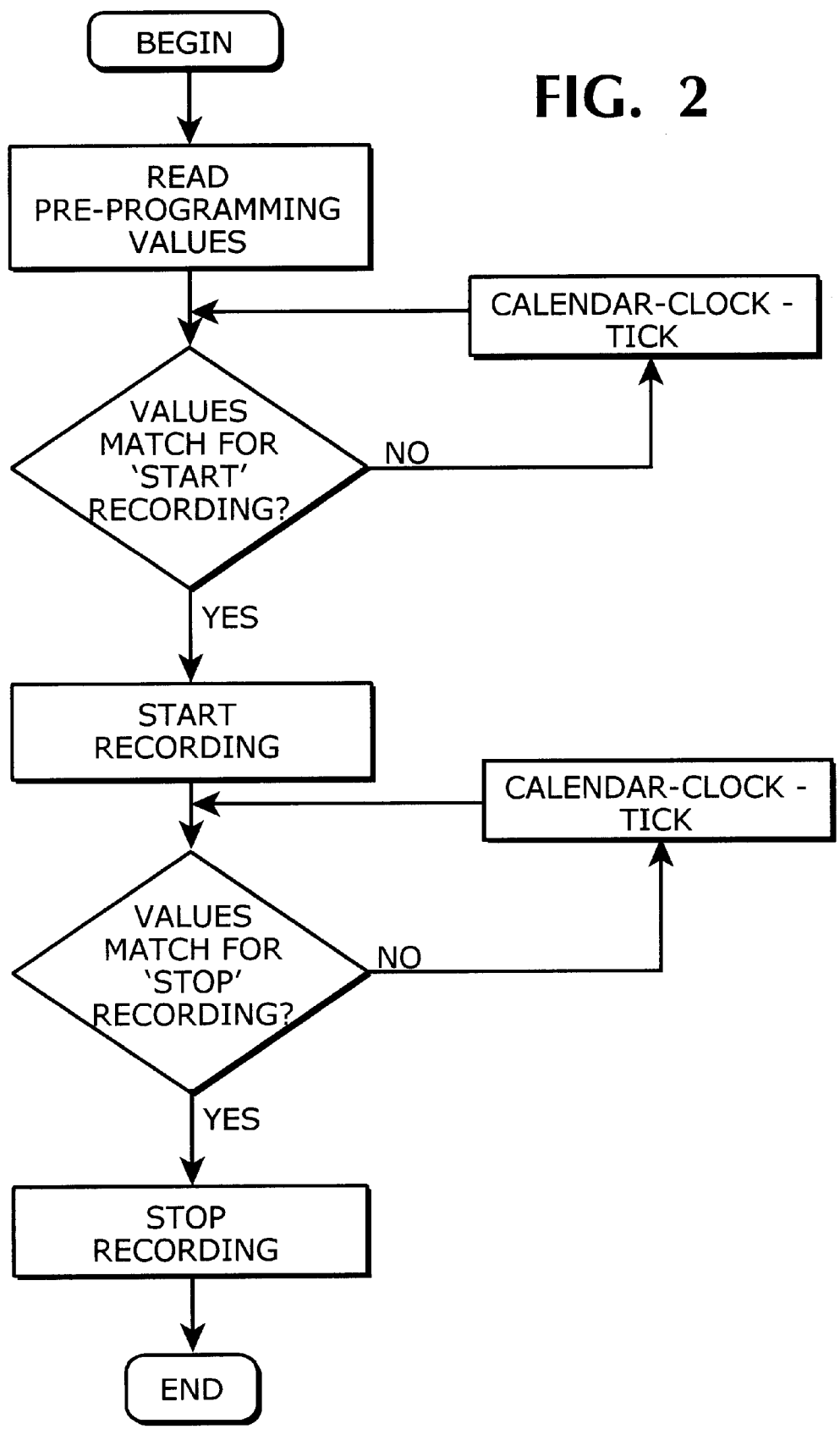
FIG. 2 is a flow chart showing programmed recording function of the first preferred embodiment.

FIG. 2 represents the sequence for programmed recording of the first preferred embodiment on an audio cassette tape or other storage medium.

When an instruction to record a broadcast in unattended mode is received, such instruction is decoded by the microprocessor unit 14 to enter in memory.

At first, the start/end pre-programming values are read. The program then makes a decision. It checks to determine if the 'begin' recording value in memory is equal to the value on the calendar-clock value reference unit 17. if the answer is 'NO' then such comparison of values continues for each calendar-clock tick until the matching value is read. At that time, the programmed recording starts. Then, the next decision is made: Is the value on the calendar-clock value reference unit 17 equal to the 'end' recording value in memory? If the answer is 'NO', the next comparison of values is made for each calendar-clock tick. This process continues until the values match. Then, the recording function is discontinued and the program ends.

The entire program is repeated for each kind of recording mode, i.e., single, daily, or weekly, selected by the listener.

FIG. 3 represents a second preferred embodiment of the invention in which a playback function and a display section are provided.

When a listener feeds in an instruction from the input peripheral unit 16, microprocessor unit 14 detects the signal and produces the information on display 22. Recording mechanism 19 records the intended program onto an audio casette tape (not shown).

When a pre-recorded cassette is played back, the audio signal on the tape is amplified by audio amplifier 20 and converted back to the actual sound by speaker 21.

While there has been shown and described two preferred embodiments of the recording and reproducing device of this invention, it is understood that reasonable variation and modification, including integrating this device with other related products such as video cassette recorders, etc., can be made by those skilled in the art without departing from the invention.

I claim:

1. A recording device comprising:
   an input for receiving electrical signals representing audible sound;
   a recording mechanism adapted to encode and record said electrical signals on recording media for later playback;
   a programmable timer for starting and stopping said recording mechanism for operating said recording mechanism during at least one user-defined interval of time;

a power output connector for providing electricity at a required voltage to an external audio source such that said audio source receives its operating power from said recording device;

said programmable timer automatically energizing said power output connector during said at least one user-defined interval of time, said user-defined interval of time is defined by data entered through an input peripheral unit connected to the programmable timer, said data includes a start time, a stop time a start day of the week and a stop day of the week and a means for alternatively setting a mode for a single interval of time, a daily interval of time, and a weekly interval of time wherein when the single mode is set only a single recording is made; when the daily mode is set, the interval repeats at the same time every day; and when the weekly mode is set, the interval repeats on the same time on the same day every week;

a display for displaying said data; and a CPU, said programmable timer is programmed using software which runs on said CPU, said software causing said CPU to drive said display such that said display displays a series of options and instructions for entering said data into said programmable timer.

2. A recording device comprising:

an input for receiving electrical signals representing audible sound;

a recording mechanism adapted to encode and recorded said electrical signals on recording media for later playback;

a programmable timer for starting and stopping said recording mechanism for operating said recording mechanism during at least one user-defined interval of time;

a power output connector for providing electricity at a required voltage to an external audio source such that said audio source receives its operating power from said recording device;

said programmable timer automatically energizing said power output connector during said at least one user-defined interval of time, said user-defined interval of time is defined by data entered through an input peripheral unit connected to the programmable timer, said data includes a start time, a stop time a start day of the week and a stop day of the week and a means for alternatively setting a mode for a single interval of time, a daily interval of time, and a weekly interval of time wherein when the single mode is set only a single recording is made; when the daily mode is set, the interval repeats at the same time every day; and when the weekly mode is set, the interval repeats on the same time on the same day every week;

a display for displaying said data; and said data further comprises information representing said required voltage, said information including whether said audio source is a microphone which does not require any power supply and whether said audio source requires AC or DC voltage, and the level of voltage if DC voltage, said programmable timer includes a CPU and said programmable timer is programmed using software which runs on said CPU, said software causing said CPU to drive said display such that said display displays a series of options and instructions for entering said data into said programmable timer and for hooking power and audio signal cables from said recording device to said audio source.

3. The recording device set forth in claim 2 wherein said data further comprises information representing whether a silent recording method or a recording while listening method of recording is selected, said recording while listening method results in audio reproduction of the audio signal during said interval.

4. A recording device comprising:

an enclosure;

a recording mechanism within said enclosure adapted to encode and record electrical signals representing audible sound on audio cassette tape and not on videocassettes for later playback, said enclosure further comprising a compartment in said enclosure that is accessible from outside the enclosure adapted to store said audio cassette tape during recording and playback operations of said recording mechanism;

an audio input jack in said enclosure adapted to accept an audio input plug from outside said enclosure for passing said electrical signals representing audible sound from an external audio signal source to said recording mechanism, said audio input jack being electrically connected to said recording mechanism;

a programmable timer within said enclosure operable to start and stop said recording mechanism and to operate said recording mechanism during at least one user-defined interval of time.

5. The recording device set forth in claim 4 wherein said recording mechanism is further adapted to encode and reproduce said electrical signals in a playback mode, said recording device further comprising an audio amplifier operable to amplify said electrical signals creating amplified electrical signals and a speaker operable to convert said a amplified electrical signals into audible sound waves.

6. The recording device set forth in claim 4 wherein said user-defined interval of time is defamed by data entered through an input peripheral unit connected to the programmable timer, said data including a start time, a stop time, a start date, and a mode selection, said mode selection being either a single recording mode, a daily recording mode, or a weekly recording mode, said programmable timer functioning in response to said data by making only a single recording during the interval when in the single recording mode, repeating the interval at the same time every day when the in the daily recording mode, and repeating the interval at the same time on the same day every week when in the weekly recording mode.

7. The recording device set forth in claim 6 further comprising a display for displaying said data.

8. The recording device set forth in claim 7 wherein said programmable timer includes a CPU and said programmable timer is programmed using software which runs on said CPU, said software causing said CPU to drive said display such that said display displays a series of options and instructions for entering said data into said programmable timer.

9. The recording device set forth in claim 7 further comprising a power output connector in said enclosure for providing electricity at a required voltage to an external audio source such that said audio source receives its operating power from said recording device and said programmable timer automatically energizes said power output connector during said at least one user-defined interval of time.

10. The recording device set forth in claim 9 wherein said data further comprises information representing said required voltage, said information including whether said audio source is a microphone which does not require any power supply and whether said audio source requires AC or DC voltage and the level of voltage if DC voltage, said programmable timer includes a CPU and said programmable timer is programmed using software which runs on said CPU, said software causing said CPU to drive said display such that said display displays a series of options and instructions for entering said data into said programmable timer and for hooking power and audio signal cables from said recording device to said audio source.

11. The recording device set forth in claim 10 wherein said data further comprises information representing whether a silent recording method or a recording while listening method of recording is selected, said recording while listening method results in audio reproduction of the audio signal during said interval.

\* \* \* \* \*